Aug. 19, 1941.  R. W. BROWN  2,253,477
APPARATUS FOR FABRICATING TUBULAR STRUCTURES
Filed March 31, 1938  3 Sheets-Sheet 1

INVENTOR
Roy W. Brown
BY
Ely T. Frye
ATTORNEYS

Aug. 19, 1941.   R. W. BROWN   2,253,477
APPARATUS FOR FABRICATING TUBULAR STRUCTURES
Filed March 31, 1938   3 Sheets-Sheet 2

INVENTOR
Roy W. Brown
BY Ely & Frye
ATTORNEYS

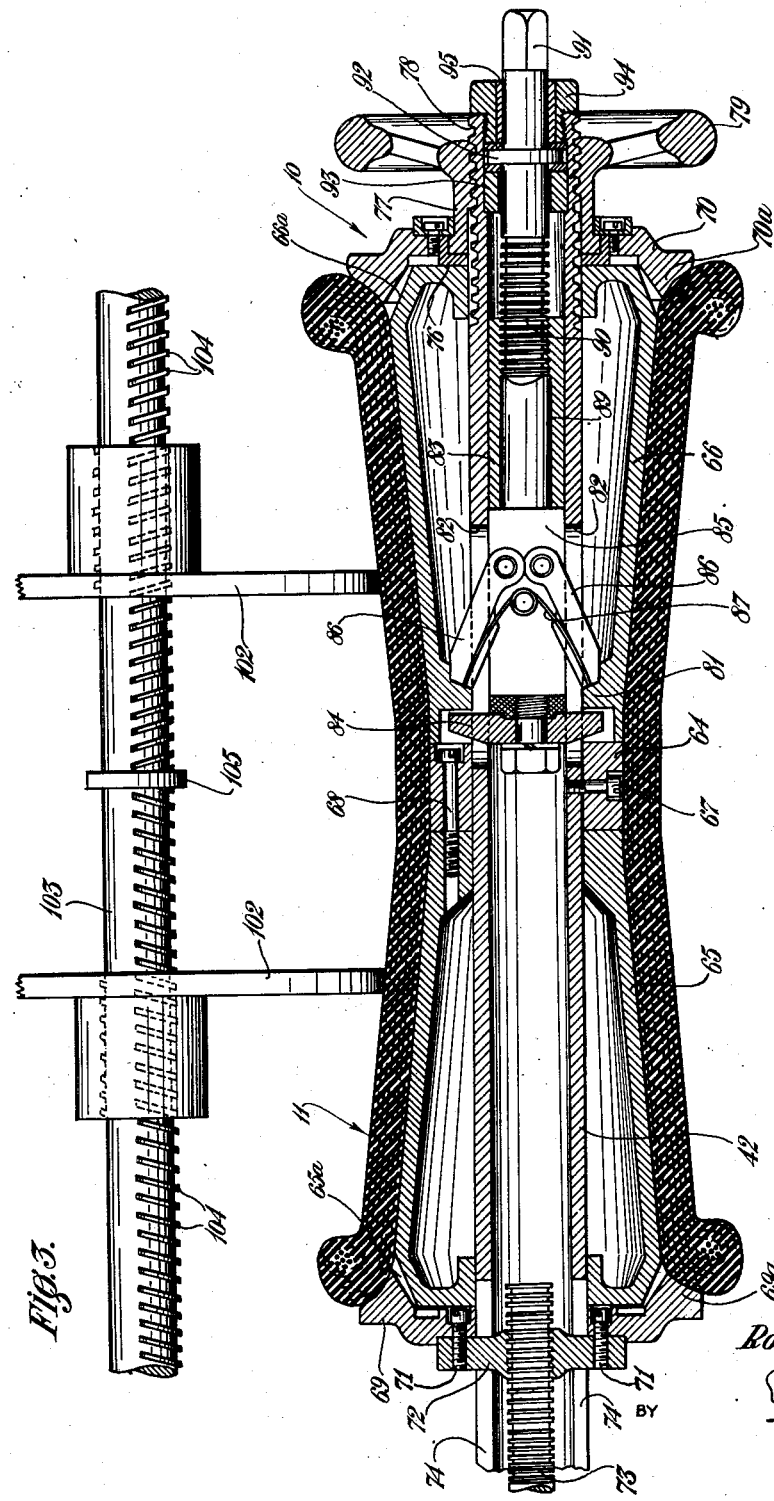

Patented Aug. 19, 1941

2,253,477

UNITED STATES PATENT OFFICE 2,253,477

APPARATUS FOR FABRICATING TUBULAR STRUCTURES

Roy W. Brown, Akron, Ohio, assignor to The Firestone Tire & Rubber Company, Akron, Ohio, a corporation of Ohio Application March 31, 1938, Serial No. 199,321

11 Claims. (Cl. 154—10)

This invention relates to apparatus for the fabrication of tubular structures, and more especially it relates to the manufacture of tubular structures of rubber and fabric that require subsequently to be distended to final shape, and vulcanized.

The apparatus is designed primarily for the fabrication of tubular structures that subsequently are distended to double-torus shape or bellows form, for use as pressure containers in pneumatic suspension systems for vehicles. As contructed by the apparatus of the invention, the tubular structure has a cylindrical medial region and is slightly flared toward its respective ends, each of the latter including an inextensible reinforcement or bead.

The chief objects of the invention are to provide improved apparatus of the character mentioned that will conveniently supply different grades or sizes of sheet rubber and rubberized fabric to a form or mandrel upon which the tubular structure is fabricated; to provide for the application of the sheet rubber and fabric to the building form under determinate tension; to avoid the entrapping of air between successive plies of material on the building form; to provide an improved building form upon which the tubular structure is fabricated; and to provide a sectional building form having improved means by which it may be assembled and dis-assembled. Other objects will be manifest as the specification proceeds.

Of the accompanying drawings:

Figure 3 is a longitudinal, diametric section through the building form of the apparatus, and the work thereon.

Figure 1:
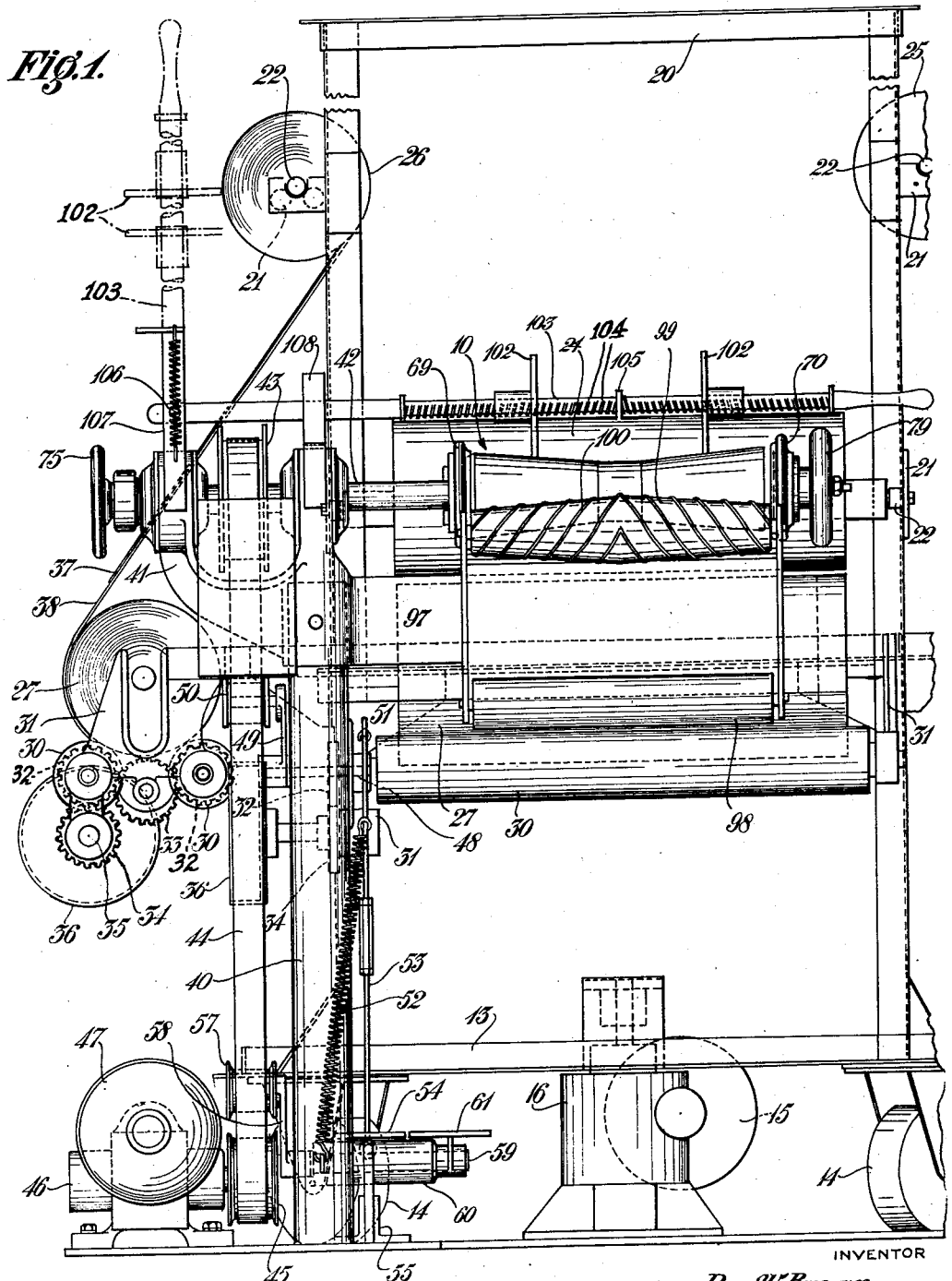
Figure 1 is a front elevation of apparatus embodying the invention, in its preferred form.

Referring to the drawings, there is shown a building form generally designated 10, upon which a tubular laminated structure of rubber and fabric may be built, such a structure being shown at 11, Figure 3. Means is provided for rotating the form 10, and for feeding thereto respective strips of building material, the latter being withdrawn from an adjacent storage device, and being delivered to the building form under determinate tension.

Figure 2:
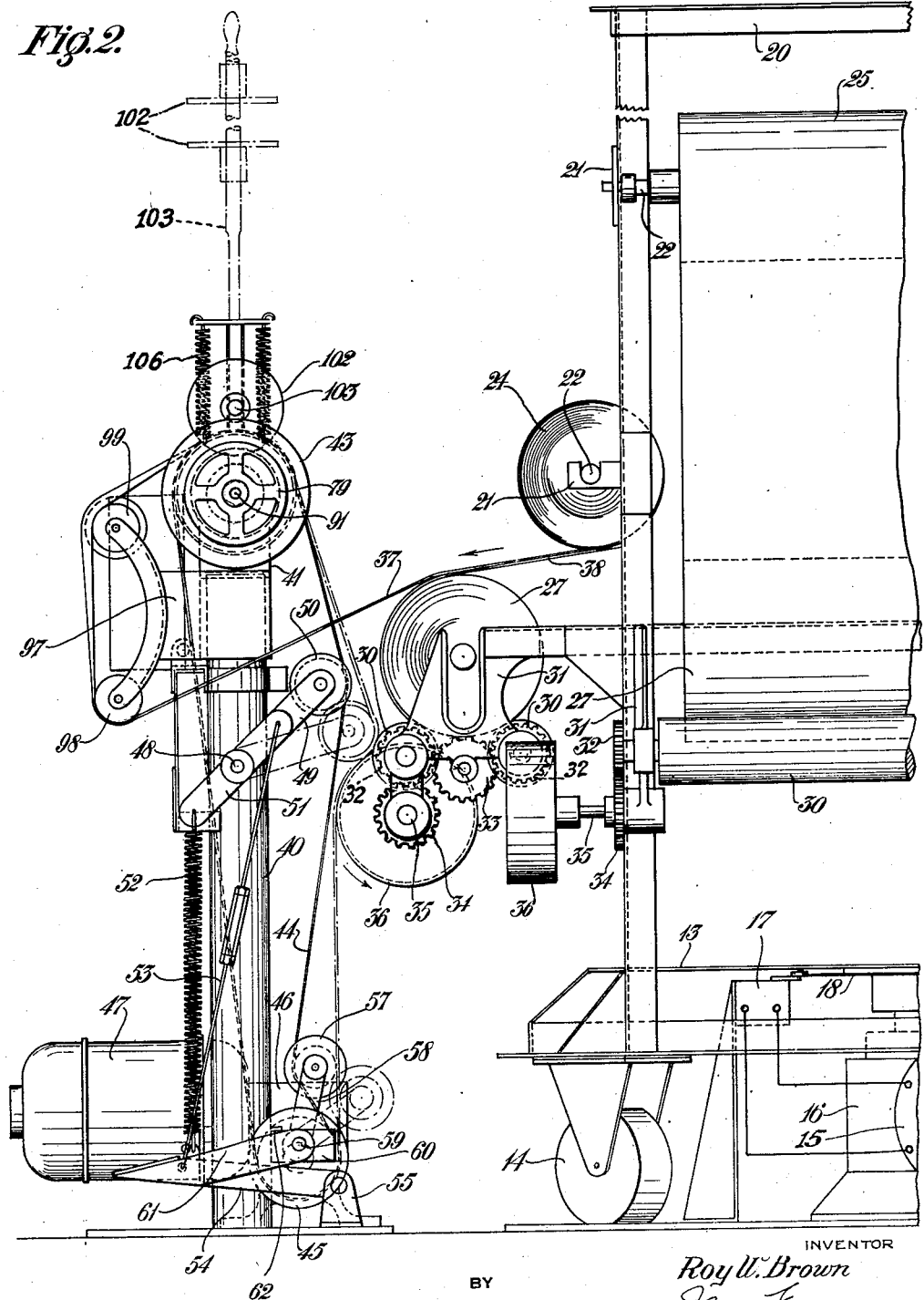
Figure 2 is a side elevation thereof.

The storage device for the building material consists of a turntable or turret 13 that rests upon a plurality of supporting rollers 14, 14 and is rotated about a vertical axis by means of a motor 15 driving through a reduction gear device 16. Suitable electrical switch means (not shown) is provided whereby an operator may start the motor 15 at will to rotate the turntable, the stopping of such rotation being effected automatically through the agency of a cut-out switch 17, Figure 2, that is operated by a cam or dog 18 mounted upon the turntable. There are four of the dogs 18, and they are so positioned as to stop rotation of the turntable after it has moved through 90°, the motor 15 being provided with a magnetic brake to prevent over-run or coasting after the current is cut off. In the stopping positions of the turntable, the various supplies of material carried thereby are properly positioned for delivery to the building form 10.

Mounted upon the turntable 13 is an upstanding, four-sided framework or rack 20, the corner posts of which carry brackets 21, 21 that are arranged in pairs, at different elevations, and are adapted rotatably to support rods or shafts 22, 22 upon which respective rolls of building material are mounted, such rolls being shown at 24, 25 and 26. The building material consists in part of unvulcanized rubber strip or sheet material, and in part of bias-cut, rubberized cord fabric. Part of the latter is cut on the opposite bias to the remainder thereof, the different bias cuts being in separate rolls. In each roll of fabric or sheet rubber there is a liner interposed between the respective convolutions of the building material. When building material is withdrawn from the rolls 24, 25 or 26, the liner on said roll is withdrawn with the building material, the liner being re-rolled on the turret and the building material, separated from the liner, passing to the building form 10. Rolls of re-wound liner are shown at 27, 27 in the drawings.

Rewinding of the liners in the rolls 27 is effected with the same power means that is provided for driving the building form 10, and by driving the liner rewind roll at determinately slower surface speed than said building form, determinate tension is imparted to the building material passing to said form. For driving the liner rewind rolls 27, each of them is supported upon a pair of parallel driven rollers 30, 30 that are journaled in pairs of bearing brackets 31, 31 mounted upon one side of the framework 20 and projecting laterally therefrom. The shafts of rollers 30 extend beyond one of the brackets 31 and carry respective gears 32, which gears are meshed with an intermediate idler pinion 33. One of the gears 32 also is meshed with a gear 34 that is carried by a short shaft 35 that is journaled in bracket 31, said shaft 35 also carrying a friction-surfaced pulley 36. Rotation of any pulley 36 will effect rotation of the associated liner rewind roll 27 and thus withdraw building material, designated 37, and liner, designated 38, from the corresponding supply roll 24, 25 or 26, the liner 38 being wound onto the rewind roll 27 and the building material passing to the building form 10 as presently will be explained. As previously explained, the turntable 13 is rotatable, and has four stopping positions in each of which one of the supply rolls carried by the turntable is in position to deliver building material to the building form 10. The friction pulley 36 that is associated with the supply roll that is in position to deliver material to the building form is rotatable by means of the power unit that drives said building form, there being means controlled by the operator for engaging said pulley with said power means, as subsequently will be described.

The structure that supports and drives the building form 10 comprises a vertical post 40 upon the top of which is a two-arm journal bracket 41 in which is journaled an elongate hollow spindle 42, said spindle extending laterally to one side of the bracket, in overhanging relation to the post, and having the building form 10 mounted upon the outer end thereof. The arrangement is such that the building form is in lateral alignment with one side of the turntable 13, in position to receive building material therefrom. Mounted upon the hollow spindle 42, between the arms of bracket 41, is a pulley 43, and trained about the latter is an endless driving belt 44 that also is trained about a driving pulley 45 carried by a reduction gear device 46, the latter being driven by a motor 47. Journaled in the post 40, transversely thereof, is a rock-shaft 48, and mounted upon one projecting end thereof is an arm 49 upon the free end of which is carried a pulley or sheave 50. The latter is disposed in the plane of the driving belt 44 in engagement therewith, and adapted, upon occasion, to force said belt into driving engagement with the pulley 36 as presently will be explained. Mounted upon the other projecting end portion of rock-shaft 48 is a lever 51 comprising oppositely projecting arms, the free end of one of said arms being connected to one end of a tension spring 52, the other end of the latter being attached to a fixed point on the post 40. Connected to the free end of the other arm of lever 51 is a link 53, the other end of the latter being connected to a foot pedal 54 that is pivotally mounted in a floor-bracket 55. The arrangement is such that spring 52 normally holds the arm 49 in upwardly tilted position so that the driving belt 44 is out of engagement with friction pulley 36. Upon the depressing of the foot pedal 54, link 53 tilts the lever 51 against the tension of spring 52, and thereby swings the free end of arm 49 downwardly so that the sheave 50 thereon forces the belt 44 into frictional driving engagement with pulley 36, as shown in broken lines in Figure 2. The motor 47 is constantly driven, and the belt 44 is moving in the direction that causes the pulley 36 to rotate in the direction indicated by the arrow in Figure 2.

The belt 44 is of such length that when the sheave 50 is in the lifted position shown in full lines in the drawings, the belt engages pulleys 43 and 45 but loosely, and there is not sufficient driving friction to turn the spindle 42. For tightening the belt 44 about pulleys 43, 45, when it is desired to drive spindle 42 without driving pulley 36, an idler sheave 57, positioned in the plane of the belt, is journaled on the free end of an arm 58 that is mounted upon one end of a rock-shaft 59, said rock-shaft being journaled in a bearing bracket 60 mounted upon post 40 near the base thereof. Mounted upon the other end of said rock-shaft 59 is a forwardly extending foot pedal 61. The arm 58 always is so obliquely positioned that the weight of the arm and sheave 57 normally urges the foot pedal 61 upwardly against a position stop 62, the sheave then being in the position shown in broken lines in Figure 2, in which position it exerts no tightening effect upon the belt 44. When the foot pedal 61 is depressed, the arm 58 is swung angularly to the position shown in full lines in Figure 2, and the sheave 57 engages the driving belt to deflect and tighten the same about pulleys 43, 45.

The building form 10 that is carried by spindle 42 is best shown in Figure 3 to which attention is directed. As shown therein, the said form comprises a short medial section 64, and two relatively long, generally frusto-conical, lateral sections 65, 66 in axial alignment with said medial section at each side thereof, said lateral sections being flared or divergent toward their outer ends. Section 64 is secured in fixed position on the spindle 42 by a set screw 67, and section 65 is secured to section 64, on the side thereof nearest bracket 41, by one or more set screws 68. Section 66 is removably retained on spindle 42 by means presently to be described. Each lateral section 65, 66 has an end face at its larger end that is normal to the axis of the form, and each has a frusto-conical surface 65a, 66a respectively that is reversely tapered with relation to the major taper of the form section, and joins the latter to the end face of the section. The tapered surfaces 65a, 66a of the form are utilized during the initial operations of the fabrication of the product structure 11. Coaxially abutting the respectively end faces of the form 10 are respective movable metal cap plates 69, 70. Each of said cap plates is formed on the side thereof that abuts the form-section with a laterally projecting circumferential flange 69a or 70a that overlies the frusto-conical surface 65a or 66a respectively of the adjacent form-section, the inner circumferential surface of said flanges being tapered parallel to the said surfaces 65a, 66a, and being somewhat spaced therefrom. The outer circumferential surface of each cap-flange 69a, 70a is sloped reversely of the inner circumference thereof, and thus flares outwardly toward the base of the flange.

Cap plate 69 is axially apertured so as to fit about the spindle 42, and it is secured, by means of cap screws 71, to respective radial arms formed on a nut 72. The latter is mounted interiorly of the spindle 42, being threaded upon an axial screw 73 therein, the radial arms of said nut extending outwardly, in diametrically opposite directions, through respective longitudinally extending slots 74, 74 in opposite sides of said spindle. Screw 73 extends to the adjacent end of spindle 42 and is there provided with a hand-wheel 75, Figure 1, by means of which it may be manually rotated, to effect axial movement of cap plate 69. Cap plate 70 is axially apertured and journaled upon an annular bushing 76 that circumscribes spindle 42, said bushing being mounted upon the end portion of a nut 77, the free end portion of spindle 42 being threaded at 78 to receive said nut 77. The latter is formed with an integral hand wheel 79 by which it may be manually rotated to move it axially along the spindle and thereby to move cap plate 70 from and toward section 66 of the building form.

Section 66 of the building form is removable from the spindle 42, after cap plate 70 has been removed therefrom, for the purpose of removing a fabricated structure 11 from the form. To this end the said section 66 is formed interiorly, near its smaller end, with a circumferential flange 81 that slidingly engages the surface of spindle 42. The medial region of the latter is formed with diametrically opposed, longitudinally extending slots 82, 82 extending both ways from the normal, operative position of the flange 81 of the form section. Mounted for sliding axial movement within the spindle 42 is a slide 83, the inner end of which has a cross piece 84 secured thereto, said cross piece extending radially outwardly through the respective slots 82 of the spindle and being positioned adjacent one lateral face of the section-flange 81, between the latter and form section 64. Adjacent its inner end the slide 83 is diametrically slotted at 85, which slot is aligned with slots 82 of the spindle, and has a pair of fingers 86, 86 pivotally mounted thereon, there being a torsion spring 87 positioned between said fingers normally urging their free ends outwardly through said slots 82. In their outermost positions, shown in Figure 3 of the drawings, the free ends of fingers 86 engage the flange 81 of the form section 66, on the opposite side of said flange from the cross piece 84. Withdrawal of the fingers 86 from the flange 81 is effected by outward axial movement of the slide 83 (to the right as viewed in Figure 3) said fingers being swung angularly inwardly by reason of their engagement with the spindle wall at the end of slots 82.

For effecting axial movement of slide 83, the outer end of said slide is cored out at 89 to tubular form, and threaded thereinto is an axial screw 90 that extends outwardly of the slide to a point beyond the end of the spindle 42, the outer end portion of the screw being squared, as at 91, to receive a suitable turning tool, such as a crank (not shown). For securing the screw 90 against movement axially of the spindle, said screw is formed with a radial flange 92 that is disposed interiorly of the spindle, and is confined between an annular member 93 mounted in the spindle and a nut 94 that is threaded into the outer end of the spindle, said nut comprising an annular axial bushing 95 that constitutes a bearing for screw 90. The arrangement is such that when the various elements of the form 10 are in the positions shown in Figure 3, the fingers 86 are holding form section 66 firmly in abutting relation with medial form section 64, and there is a slight clearance between cross piece 84 and the adjacent face of flange 81 on said section 66. When it is desired to collapse the form to remove a fabricated structure 11 therefrom, handwheel 79 is turned to retract cap plate 70 from the end of the form and to remove it from the spindle. Thereafter screw 90 is rotated to draw slide 83 outwardly, to the right as viewed in the drawings, thus causing cross piece 84 to engage flange 81 of form section 66 to move the latter axially of the spindle, and slightly retracting fingers 86 from the opposite side of said flange. Continued outward movement of slide 83 moves the fingers 86 past the ends of slots 82 in the spindle, with the result that said fingers are folded together, against the force of spring 87, until they are entirely within the spindle 42. The form section 66 may then be entirely removed from the spindle and from within the structure 11, thus enabling the latter readily to be stripped from the other form sections 64, 65. The operations described are performed in reverse order to re-assemble the form to operative condition.

As previously stated, the building form 10 is rotated by the spindle 42 through the agency of pulley 43 and driving belt 44, the surface speed of said form being greater than speed at which the liner rewind roll 27 is driven, so that determinate tension is imparted to the building material that is being drawn onto the form during the fabrication of structure 11. For guiding said building material, such as the strip 37, onto said building form, a bracket 97 is supported upon the post 40 and extends laterally therefrom, and journaled in said bracket are two guide rollers 98, 99 that are parallel to each other and to the axis of form 10, the axes of said rollers being disposed in the same vertical plane. The lower roller 98 has a plane cylindrical surface. The upper roller 99 has a surface that tapers from its medial region toward its respective ends, the arrangement being such that material passing over said roller 99 stretched in its medial region to a greater extent than at its lateral margins. The material thus handled conforms more readily to the reversely flared shape of the building form 10 onto which it passes immediately after leaving roller 99. Guide roller 99 has its surface provided with several ribs 100 that are helically arranged thereon, and in reverse pitch or angle on opposite sides of the middle of the roller. The ribs 100 exert a desirable tentering effect on the material passing thereover. The roller 99, by reason of its stretching and tentering effect upon the building material, causes the latter to pass onto the form 10 without buckling or wrinkling, with the result that entrapment of air between the plies of material on the form substantially is obviated.

For pressing or stitching together the plies of building material applied to the form 10, a pair of rotatable stitching discs 102, 102 are provided, said discs being mounted upon a swingable arm 103. The arm 103 is provided with right hand and left hand screw threads 104, 104 each side of a collar or flange 105 thereon, said flange being so positioned as to be opposite the medial section 64 of the form 10 when the arm is swung to horizontal position, parallel to the axis of said form, as shown in full lines in the drawings. The screw threads 104 extend but half way around the arm 103, the threaded half of the arm being disposed downwardly when the arm is in horizontal, operative position. The stitching discs 102 are provided with hub portions, and the latter are formed with internal screw threads that are engageable with the threads 104 of the arm. When the arm 103 is so angularly positioned that the discs rest upon the upper, unthreaded side of the arm, the threads in the discs are out of engagement with the threads 104 of the arm and the discs readily are slid longitudinally of the latter. When the discs rest upon the work on the form 10 and the arm is supported by the discs, the threads of the arm and discs are in operative engagement with each other. Rotation of the work then rotates the discs and the screw threads cause them to move longitudinally of the arm in opposite directions, the screw threads being so arranged with relation to the direction of rotation of the work that the latter causes the discs to move away from each other, toward opposite ends of the work, and thus to force out any air that may be trapped between the plies thereof. The arm 103 is pivotally mounted at 106 upon a bracket 107 rising from one side of bracket bearing bracket 41, there being a slotted guide structure 108 mounted upon the other side of bracket 41 for receiving the arm when it is in lowered, operative position. When not in use the arm 103 is moved to the vertical position shown in broken lines in Figures 1 and 2 of the drawings.

The invention provides for the facile and economical manufacture of tubular structures of rubber and fabric, it produces a superior product, and it achieves the other advantages set out in the foregoing statement of objects.

Modification may be resorted to without departing from the spirit of the invention, or the scope thereof as defined by the appended claims.

What is claimed is:

1. In apparatus for fabricating tubular structures, the combination of a rotatable building form having a medial region of reduced diameter as compared to the diameter of the ends thereof, means for feeding building material to said form under tension, and means engaging said strip material prior to its application to the building form for locally stretching the central portion of said material to enable it more readily to wrap around the form without buckling or wrinkling.

2. A combination as defined in claim 1 in which the last mentioned means is a roller having a medial region of larger diameter than the end portions thereof.

3. In apparatus of the character described, the combination of a rotatable, hollow spindle, a transversely divided sectional building form thereon, said form comprising a section having an inwardly extending flange, said section being slidable axially of the spindle to enable it to be removed therefrom, and means carried interiorly of the spindle and operating through slots therein to engage said flange of said movable section and retain it on the spindle.

4. In apparatus of the character described, the combination of a rotatable hollow spindle, a transversely divided, sectional building form thereon, said form comprising a section having an inwardly extending flange, said section being slidable axially of the spindle to enable it to be removed therefrom, radial fingers projecting from the interior of the spindle through slots therein and engageable with said flange of said section to retain it on the spindle, and means operable from the exterior of the spindle for effecting projection and retraction of said fingers.

5. In apparatus of the character described, the combination of a rotatable hollow spindle, a transversely divided, sectional building form thereon, said form comprising a removable section having an inwardly extending flange, said section being slidable axially of the spindle, a slide disposed interiorly of the spindle, means on said slide projecting through slots in the spindle for engagement with said flange of said movable form section, and means for moving said slide longitudinally of said spindle.

6. In apparatus of the character described, the combination of a rotatably hollow spindle, a transversely divided, sectional building form thereon, said form comprising a removable section having an inwardly extending flange, said section being slidable axially of the spindle, a slide disposed interiorly of the spindle, pivotally mounted fingers on the slide yieldingly urged outwardly, through slots in the spindle, for engagement with said flange of said movable form section, and means for moving said slide longitudinally of the spindle.

7. In apparatus of the character described, the combination of a rotatable hollow spindle, a transversely divided, sectional building form thereon, said form comprising a hollow removable section that is slidable axially of the spindle, and provided interiorly with a circumferential, inwardly extending flange, a slide disposed interiorly of the spindle, retractible fingers on the slide projectable through slots in the spindle and adapted to engage one face of the form flange, a cross piece fixed to the slide and projecting through slots in the spindle to engage the opposite face of the form flange, and means for moving said slide longitudinally of the spindle, alternatively, to place said fingers in engagement with said flange to retain said section in position and to pull said section from said spindle.

8. A combination as defined in claim 7 including means for retracting the fingers to a position interiorly of the spindle as the slide moves toward the outer end of the latter.

9. Apparatus for fabricating tubular structures comprising a rotatable building form, said form comprising two frusto-conical sections, the small ends being in confronting relation whereby said form has a smaller diameter in its medial region than at the respective ends thereof.

10. Apparatus for fabricating tubular structures comprising a rotatable building form, said form comprising two frusto-conical sections, the small ends being in confronting relation whereby the diameter of said form is smaller in its medial region than at the respective ends thereof, and cap plates at the respective ends of the form movable axially relatively thereof.

11. In apparatus for fabricating a tubular structure, a combination of a building form, a stock rack adjacent thereto carrying building material in strip form, means for feeding said strip material from said stock rack, said means comprising a pulley, single power means, a transmission belt from said power means to said building form, said belt being normally loosely mounted so as normally to transmit no driving force to said form, means for selectively deflecting said belt into frictional driving engagement with said pulley to simultaneously tighten said belt to concurrently drive the building form and to operate said strip feeding means, and means for so tightening said belt to drive said form independently of said strip feeding means.

ROY W. BROWN.